(12) United States Patent  
Miura et al.

(10) Patent No.: US 11,487,291 B2  
(45) Date of Patent: Nov. 1, 2022

(54) MOTOR CONTROL APPARATUS, NUMERICAL CONTROL APPARATUS, ROBOT CONTROLLER, AND INTEGRATED CONTROLLER SYSTEM

(71) Applicant: FANUC CORPORATION, Yamanashi (JP)

(72) Inventors: Masahiro Miura, Yamanashi (JP); Takaaki Itou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 218 days.

(21) Appl. No.: 17/037,670

(22) Filed: Sep. 30, 2020

(65) Prior Publication Data
US 2021/0157320 A1 May 27, 2021

(30) Foreign Application Priority Data

Nov. 22, 2019 (JP) .............................. JP2019-211402

(51) Int. Cl.
*G05B 19/414* (2006.01)
*G05D 1/02* (2020.01)
*B25J 9/16* (2006.01)

(52) U.S. Cl.
CPC .............. *G05D 1/021* (2013.01); *B25J 9/161* (2013.01); *G05B 19/414* (2013.01)

(58) Field of Classification Search
CPC ............... G05B 19/414; G05B 2219/34013
See application file for complete search history.

(56) References Cited

U.S. PATENT DOCUMENTS

| 4,956,785 | A * | 9/1990 | Kawamura | .......... G05B 19/408 |
| | | | | 700/169 |
| 6,438,444 | B1 * | 8/2002 | Mizuno | ........... G05B 19/41865 |
| | | | | 700/86 |
| 7,194,321 | B2 * | 3/2007 | Sun | ..................... G05B 19/4141 |
| | | | | 700/20 |
| 9,904,278 | B2 * | 2/2018 | Ogino | ................ G05B 19/4141 |
| 2009/0009128 | A1 * | 1/2009 | Okita | .................. G05B 13/024 |
| | | | | 318/619 |

(Continued)

FOREIGN PATENT DOCUMENTS

| JP | 2003288120 A | 10/2003 |
| JP | 201797474 A | 6/2017 |

*Primary Examiner* — Rina I Duda
(74) *Attorney, Agent, or Firm* — Hauptman Ham, LLP

(57) ABSTRACT

A motor control apparatus includes a main CPU configured to output a position command value, a plurality of integrated circuits connected to the main CPU and provided depending on the number of a plurality of motors, and a plurality of sub-CPUs connected to the plurality of corresponding respective integrated circuits, wherein each of the plurality of integrated circuits includes a motor interface control unit that outputs a drive command value to an amplifier that drives each of the motors in such a way as to move the motor to a position of the position command value. Each of the plurality of sub-CPUs controls an output of the drive command value by the motor interface control unit in the integrated circuit connected to the sub-CPU, based on the position command value and a position feedback value of the motor being read via the integrated circuit connected to the sub-CPU.

12 Claims, 6 Drawing Sheets

(56) References Cited

U.S. PATENT DOCUMENTS

| | | | |
|---|---|---|---|
| 2013/0041510 A1* | 2/2013 | Kurakake | G05B 19/4141 |
| | | | 700/275 |
| 2014/0316565 A1* | 10/2014 | Aoyama | B25J 9/161 |
| | | | 901/41 |
| 2017/0146966 A1* | 5/2017 | Hada | G05B 19/0421 |
| 2017/0146973 A1* | 5/2017 | Hada | G05B 19/19 |
| 2018/0032404 A1* | 2/2018 | Komatsu | G06F 11/1448 |

* cited by examiner

MOTOR CONTROL APPARATUS, NUMERICAL CONTROL APPARATUS, ROBOT CONTROLLER, AND INTEGRATED CONTROLLER SYSTEM

RELATED APPLICATIONS

The present application claims priority to Japanese Application Number 2019-211402, filed Nov. 22, 2019, the disclosure of which is hereby incorporated by reference herein in its entirety.

BACKGROUND OF THE INVENTION

1. Field of the Invention

The present invention relates to a motor control apparatus, a numerical control apparatus, a robot controller, and an integrated controller system.

2. Description of the Related Art

In recent years, multi-coring of a processor has been advanced. Further, a part of communication between integrated circuits is changed from conventional parallel communication to high quality serial communication. By using such a multi-core processor and a serial interface, a motor control apparatus that satisfies specifications required for a control apparatus that controls a machine, such as a machine tool, forging machinery, an injection molding machine, and industrial machinery, for example, and a robot controller that controls a robot is achieved. Hereinafter, an integrated circuit may be expressed as an "IC", and an interface may be expressed as an "I/F".

A numerical control apparatus is used for controlling a motor in a machine such as a machine tool, an injection molding machine, and industrial machinery, for example. A robot controller is used for controlling a motor in a robot, and has a configuration similar to that of the numerical control apparatus. The numerical control apparatus and the robot controller take the responsibility of motor control and input/output control (I/O control). In a motor control apparatus provided in the numerical control apparatus and the robot controller, the number of axes to be controlled corresponds to the number of motors, and the number of motors being a control target changes according to specifications, and thus it is desirable that a motor interface control unit is an individual integrated circuit (IC), and the number of integrated circuits to be connected changes according to specifications. Particularly, the numerical control apparatus and the robot controller are required to achieve a configuration that sufficiently satisfies required specifications while taking a cost into consideration, and it is desirable that the configuration is achieved in a scalable manner while an improvement in performance of components used at this time, a change in supply system, and the like are also taken into consideration.

When the numerical control apparatus and the robot controller are manufactured, a general-purpose item is generally used for a CPU (processor) used for forming a main control unit and a programmable logic control (PLC) unit, and a DSP that is normally used as a motor control unit. On the other hand, since reducing the number of components is effective for cost reduction, a portion other than the CPU and the DSP, i.e., a motor interface control unit is achieved with one IC. Such an IC that achieves the motor interface control unit is generally achieved by an integrated circuit designed for a specific application, which is called an ASIC. When a motor interface control IC formed of the ASIC is designed, only the motor interface control unit may be mounted, but a multifunction of the motor interface control IC is also achieved by further mounting the motor interface control unit in combination with another functional portion. When the motor control apparatus provided in the numerical control apparatus and the robot controller is configured by using the CPU, the DSP, and the ASIC, the CPU and the ASIC are connected to each other with a communication line, and the ASIC and the DSP are connected to each other with a communication line.

For example, as described in Japanese Unexamined Patent Publication No. 2017-097474, a numerical control apparatus has been known that includes: a CPU that outputs a position command value of a servomotor; an integrated circuit including a servo control unit that outputs a current command value to an amplifier that drives the servomotor, and an I/O unit that performs input/output of an external signal; a DSP that reads a position command value, and performs control for moving the servomotor to a position of the position command value; and a device-to-device communication path between the CPU and the integrated circuit, where the integrated circuit includes an internal bus connected to a communication interface connected to the device-to-device communication path, and the I/O unit, and an internal communication path that directly transmits a signal between the servo control unit and the I/O unit without passing through the internal bus.

For example, as described in Japanese Unexamined Patent Publication No. 2003-288120, a simultaneous activation device for a position determining module has been known that is configured to include an external simultaneous activation input fin that executes simultaneous start-up by receiving an input of an external simultaneous start-up input signal in a "high" state from an outside while an external simultaneous start-up output signal of a plurality of ASICs formed of a logical circuit is in a "high-impedance" state.

SUMMARY OF INVENTION

Since the number of axes driven by a motor provided in a machine, such as a general machine tool, and in a robot is about 3 to 32 axes, the maximum number of control axes of a motor control apparatus is often designed to be about 32 axes. On the other hand, there are also a machine tool and a robot including an extremely great number of control axes greatly exceeding 32 axes, and thus there is also a demand for a motor control apparatus including an extremely great maximum number of control axes. For example, a dedicated machine tool (index machine) that includes a plurality of component processing steps being integrated and is optimized for a series of processing of a workpiece includes an extremely great number of control axes.

In order to achieve the motor control apparatus including an extremely great number of control axes, a design change, such as a further improvement in performance of a CPU and an integrated circuit and further addition of various interfaces, is needed for a basic configuration of a motor control apparatus including a standard number of control axes (for example, about 3 to 32 axes). However, it is not easy to change a design of the basic configuration of the motor control apparatus including the standard number of control axes to be compatible with a motor control apparatus including an extremely great number of control axes. For example, when an ASIC configured for an extremely great number of control axes is newly developed aside from an ASIC configured for a standard number of control axes, a development cost increases. Further, for example, when an ASIC configured for an extremely great number of control axes is also applied to an application of an ASIC configured for a standard number of control axes, an ASIC exceeding of a specification and being high in price is used for a motor control apparatus including a standard number of control axes, and thus a price of the motor control apparatus itself increases. Further, for example, when a plurality of motor control apparatuses including a standard number of control axes are used and controlled in cooperation via a network to be compatible with an extremely great number of control axes, complication of synchronization and interpolation of the control axis between the motor control apparatuses is caused. Therefore, it is desirable that scalability with respect to the number of control axes of a motor control apparatus is improved.

According to one aspect of the present disclosure, a motor control apparatus includes: a main CPU configured to output a position command value with respect to a plurality of motors; a plurality of integrated circuits connected to the main CPU and provided depending on the number of the plurality of motors; and a plurality of sub-CPUs connected to the plurality of corresponding respective integrated circuits, wherein each of the plurality of integrated circuits includes a motor interface control unit that outputs a drive command value to an amplifier that drives a motor in such a way as to move the motor to a position of the position command value, and each of the plurality of sub-CPUs controls an output of the drive command value by the motor interface control unit in the integrated circuit connected to the sub-CPU, based on the position command value and a position feedback value of the motor being read via the integrated circuit connected to the sub-CPU.

Further, according to one aspect of the present disclosure, a numerical control apparatus configured to control a machine includes the motor control apparatus described above, and, each of a plurality of groups formed of the integrated circuit and the sub-CPU connected to the corresponding integrated circuit controls at least one motor corresponding to the group among the motors in the machine.

Further, according to one aspect of the present disclosure, a robot controller configured to control at least one robot includes the motor control apparatus described above, and, in each of a plurality of groups formed of the integrated circuit and the sub-CPU connected to the corresponding integrated circuit, controls at least one motor that serves as a drive source of the robot.

Further, according to one aspect of the present disclosure, an integrated controller system configured to control both of at least one machine and at least one robot includes the motor control apparatus described above, at least one group among a plurality of groups formed of the integrated circuit and the sub-CPU connected to the corresponding integrated circuit controls at least one motor corresponding to the group among the motors in the machine, and, in a group different from the at least one group among the plurality of groups, controls at least one motor that serves as a drive source of the robot.

BRIEF DESCRIPTION OF THE DRAWINGS

The present invention will be more clearly understood with reference to the following accompanying drawings.

DETAILED DESCRIPTION

Figure 1:
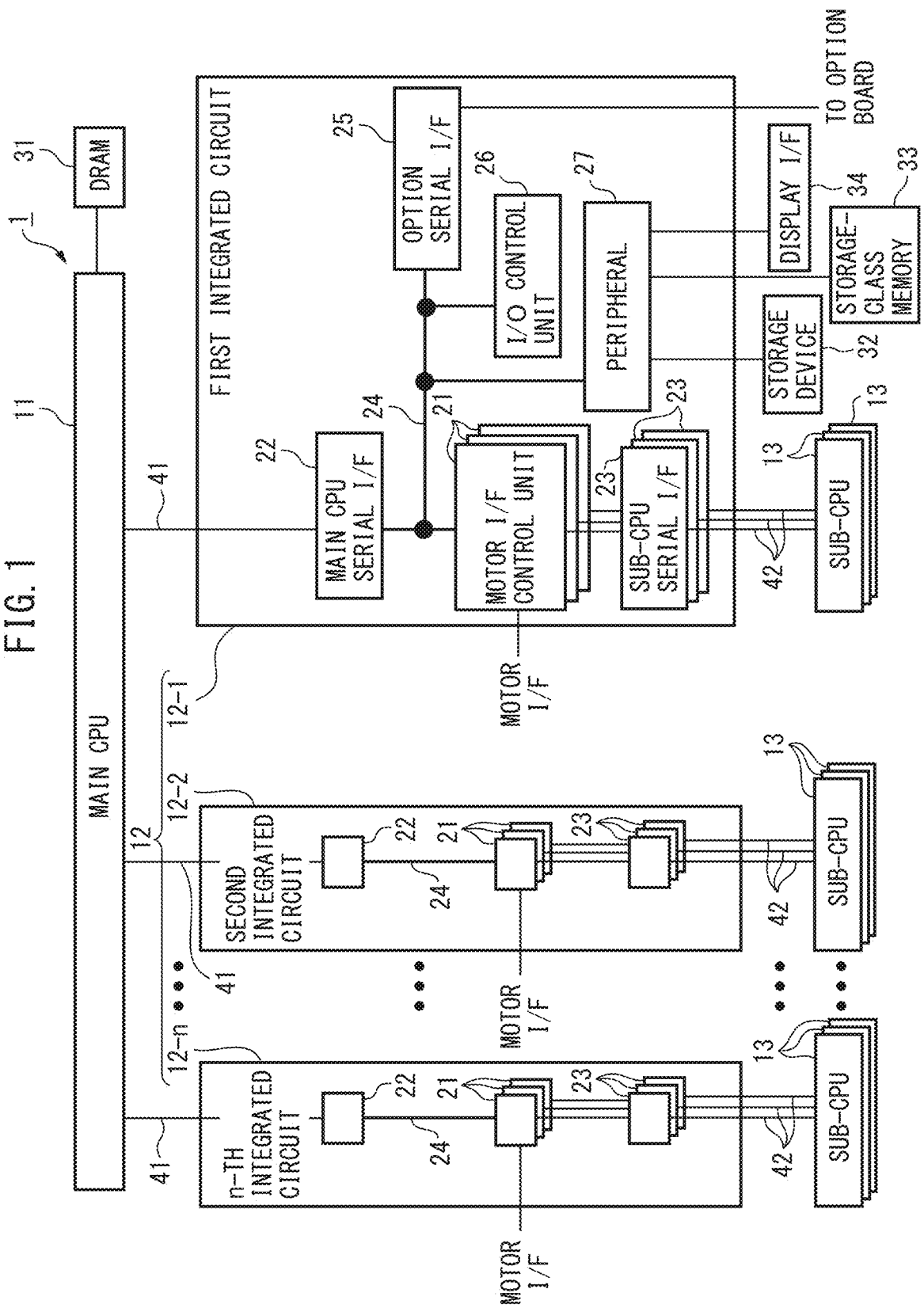
FIG. 1 is a configuration diagram illustrating a motor control apparatus according to an embodiment of the present disclosure.

A motor control apparatus, a numerical control apparatus, a robot controller, and an integrated controller system will be described below with reference to drawings. A similar element is denoted by the same reference sign in each of the drawings. Further, a scale is changed in the drawings as appropriate in order to facilitate understanding. An aspect illustrated in the drawings is one example for implementation, and the present invention is not limited to the illustrated aspect. Further, in the following description, a "position" and a "position command value" of a motor refer to a "position of a rotor" and a "position command value with respect to a rotor" of the motor, and "position control" of a motor refers to "position control with respect to a rotor" of the motor. Further, since a "speed (rotation speed)" is obtained by differentiating a "position", a "position" of a motor contains a "speed" of the motor, a "position command value" of a motor contains a "speed command value" of the motor, and a "position feedback value" of a motor contains a "speed feedback value" of the motor in an embodiment of the present disclosure. A "speed" and a "speed command value" of a motor refer to a "speed of a rotor" and a "speed command value with respect to a rotor" of the motor. Further, "speed control" of a motor refers to "speed control with respect to a rotor" of the motor.

FIG. 1 is a configuration diagram illustrating a motor control apparatus according to the embodiment of the present disclosure.

A motor control apparatus 1 according to the embodiment of the present disclosure is used for a numerical control apparatus of a machine (for example, a machine tool), a robot controller, and the like as described below. For example, a motor (not illustrated) controlled by the motor control apparatus 1 is used as a drive source of a processing axis and a peripheral axis in a machine tool, and is used as a drive source of an arm and the like and a drive source for moving a robot itself in the robot.

The motor control apparatus 1 according to the embodiment of the present disclosure includes a main CPU 11, an integrated circuit (IC) 12, and a sub-CPU 13. The main CPU 11 is connected to the integrated circuit 12 via a serial communication unit 41. The sub-CPU 13 is connected to the integrated circuit 12 via a serial communication unit 42. Further, the motor control apparatus 1 includes, for example, a DRAM 31 connected to the main CPU 11, and a storage device 32 a storage-class memory (SCM) 33, and a display interface (display I/F) 34 each connected to the integrated circuit 12.

The main CPU 11 is achieved by a multi-core (multi-thread) CPU, for example. The main CPU 11 includes a main control unit (not illustrated) generally formed by software, a programmable logic control (PLC) unit (not illustrated), and a peripheral (not illustrated) for communicating with peripheral equipment.

The main CPU 11 outputs a position command value with respect to a plurality of motors (not illustrated). As described above, a "position command value" of a motor contains a "speed command value" of the motor in the embodiment of the present disclosure, i.e., a "position command value" may be interpreted as a "speed command value".

More specifically, the main control unit of the main CPU 11 performs a function of analyzing an operation command commanded by a processing program and a sequence program in the numerical control apparatus, a robot operation program in the robot controller, or the like, and calculating and outputting a position command value with respect to all of a plurality of motors, a function of analyzing an operation command, and transmitting and receiving an ON/OFF signal to and from a machine, a sequence function of controlling input/output (I/O) of a signal to and from a machine, and the like. Further, the main CPU 11 has a function of a high speed serial communication interface (for example, PCI Express (registered trademark)) and the like. Further, the peripheral in the main CPU 11 includes an interface for performing data input/output with a storage device such as an SD and a USB connected to the outside and data input/output by communication via an RS232C (232C#1), and communicates with equipment connected to the outside.

The DRAM 31 is a main storage memory used by the main CPU 11 to perform processing. In the example illustrated in FIG. 1, the DRAM 31 is connected to the outside of the main CPU, but may be connected to the outside of the integrated circuit 12.

The main CPU 11 and the integrated circuit 12 are connected to each other via the serial communication unit 41. An example of the serial communication unit 41 includes PCI Express (registered trademark).

The integrated circuit (IC) 12 is achieved as, for example, an application-specific integrated circuit (ASIC). Alternatively, the integrated circuit 12 may be achieved by an FPGA, and may be achieved as a plurality of integrated circuits mounted on a printed circuit board.

The plurality of integrated circuits 12 are provided depending on the number of a plurality of motors being a control target of the motor control apparatus 1. The motor control apparatus 1 can handle control of various numbers of motors by changing the number of the integrated circuits 12. Thus, for example, by connecting, to the main CPU 11, the plurality of integrated circuits 12 formed of an ASIC configured for a standard number of control axes (for example, 3 to 32 axes and the like), an extremely great number of control axes (for example, about 33 to several hundred axes and the like) can also be controlled. Thus, according to the embodiment of the present disclosure, scalability with respect to the number of control axes can be improved. Note that, in the example illustrated in FIG. 1, the plurality of integrated circuits 12 are represented by n integrated circuits (note that n is an integer of 2 or more), i.e., the plurality of integrated circuits 12 are represented by a first integrated circuit 12-1, a second integrated circuit 12-2, . . . , and an n-th integrated circuit 12-n.

The integrated circuit 12 includes a motor interface control unit (motor I/F control unit) 21, a main CPU serial interface (I/F) 22, a sub-CPU serial interface (I/F) 23, an internal bus 24, an option serial interface (I/F) 25, an input/output (I/O) control unit 26, and a peripheral 27. The integrated circuit 12 may include a RAM and the like built therein in addition to those illustrated. Note that, in FIG. 1, in order to simplify the drawing, the option serial interface 25, the input/output control unit 26, and the peripheral 27 are expressed only for the first integrated circuit 12-1, and the illustration thereof is omitted from the second integrated circuit 12-2 and the n-th integrated circuit 12-n.

The motor interface control unit 21, the main CPU serial interface 22, the option serial interface 25, the input/output control unit 26, and the peripheral 27 are connected to one another via the internal bus 24.

The main CPU serial interface 22 is connected to the main CPU 11 via the serial communication unit 41, and the main CPU 11 and the motor interface control unit 21 communicate with each other. Each element, other than the main CPU serial interface 22, connected with the internal bus 24 is assigned with an address. The main CPU serial interface 22 detects an address of a transmission destination included in a serial signal transmitted from the main CPU 11, converts data and the address into parallel data, and then transmits the parallel data to an element of the transmission destination via the internal bus 24. Further, the main CPU serial interface 22 serially converts data with the main CPU 11 as a transmission destination address, which are output from each element to the internal bus 24, and transmits the data to the main CPU 11.

Note that data transmission from the main CPU 11 to each element in the integrated circuit 12 and data transmission from the main CPU serial interface 22 to the main CPU 11 may simultaneously occur. Thus, the main CPU serial interface 22 includes an arbiter that mediates an order of data to be communicated in response to a degree of priority of each data communication, and a buffer memory that temporarily holds the data. In the motor control apparatus 1, a data signal related to motor control has a high degree of priority and periodically occurs, and thus communication of the data signal related to the motor control has priority. However, the present invention is not limited to this, and data communication having a higher degree of urgency may have higher priority.

The integrated circuit 12 and the sub-CPU 13 are connected to each other via the serial communication unit 42. An example of the serial communication unit 42 includes PCI Express (registered trademark).

The sub-CPU serial interface 23 in the integrated circuit 12 is connected to the sub-CPU 13 via the serial communication unit 42, and the sub-CPU 13 and the motor interface control unit 21 communicate with each other. The sub-CPU serial interface 23 and the serial communication unit 42 are provided between the motor interface control unit 21 and the sub-CPU 13 connected to the motor interface control unit 21.

The motor interface control unit 21 outputs a drive command value (for example, a current command value) to an amplifier that drives a motor in such a way that the motor moves to a position of a position command value (or in such a way that the motor rotates at a speed of a speed command value). The drive command value output from the motor interface control unit 21 is transmitted to the amplifier via a motor interface (I/F) located outside the integrated circuit 12. To describe a series of flows in more detail, a position command value from the main CPU 11 is transmitted to the sub-CPU 13 via the motor interface control unit 21, the sub-CPU 13 generates a drive command value of the motor, based on the position command value, and transmits the drive command value to the motor interface control unit 21, and the motor interface control unit 21 outputs the drive command value to the amplifier via the motor interface.

The integrated circuit 12 includes at least one motor interface control unit 21. The integrated circuit 12 has performance capable of outputting a plurality of drive command values corresponding to a plurality of respective motors in the motor interface control unit 21. When one integrated circuit 12 controls a plurality of motors, the one integrated circuit 12 may include one motor interface control unit 21, may include the same number of the plurality of motor interface control units 21 as the number of the motors, or may include a smaller number of the plurality of motor interface control units 21 than the number of the motors. The number of the motor interface control units 21 provided in the integrated circuit 12 may be set as appropriate depending on a control period and control accuracy of a motor, and the like, for example.

The motor interface connected to the motor interface control unit 21 outside is an interface for connecting the amplifier, and amplifier control, digital signal input/output processing, analog signal input/output processing, control of various sensors, and the like are performed via the motor interface. A power line to a motor that drives each control axis of a machine tool or a robot, and a feedback input signal to which a position feedback value being a detection value of a position of each motor is transmitted are connected to the amplifier. The number of the motor interface control units 21 is the same as the number of the motor interfaces. Further, a plurality of amplifiers provided in such a way as to correspond to a plurality of motors can be connected in series to one motor interface.

More detailed description of a processing operation of the motor interface control unit 21 is as follows. A position command value from the main CPU 11 is written to a RAM region (not illustrated) built in the motor interface control unit 21 via the serial communication unit 41, the main CPU serial interface 22, and the internal bus 24. The motor interface control unit 21 transmits a drive command value (for example, a current command value) for the amplifier being generated from the position command value to the amplifier via the motor interface. Note that processing of generating a drive command value from a position command value requires a lot of arithmetic processing and needs to be performed at a high speed. Therefore, a multi-core DSP as the sub-CPU 13 as described below is connected to the integrated circuit 12. The sub-CPU 13 formed of the multi-core DSP reads a position command value via the serial communication unit 42, and performs the arithmetic processing of a drive command value of a motor needed for control for moving the motor to a position of the position command value.

The amplifier performs current control by, for example, a PWM signal, based on a drive command value received via the motor interface, and transmits a value of a current sensor built in the amplifier to the motor interface control unit 21 through the motor interface. Further, a position feedback value detected by the motor is also transmitted to the motor interface control unit 21 through the motor interface, and the position feedback value is written to the motor interface control unit 21. The sub-CPU 13 computes a next current control command value, based on the value of the current sensor and the position feedback value received via the motor interface control unit 21, and transmits the current control command value to the motor interface control unit 21. The motor interface control unit 21 receives the current control command value from the sub-CPU 13, and transmits the current control command value to the amplifier via the motor interface.

The option serial interface (I/F) 25 in the integrated circuit 12 is an interface used for connection to external option equipment such as an option board.

The input/output (I/O) control unit 26 in the integrated circuit 12 controls input/output (I/O) communication, and includes an I/O RAM (not illustrated) for storing input/output signal data (DI/DO), for example. The input/output signal data for I/O are read/written by a sequence program executed on the main CPU 11 via the internal bus 24, the main CPU serial interface 22, and the serial communication unit 41.

The peripheral 27 in the integrated circuit 12 includes a keyboard, an analog output, a sensor data input (for example, a skip signal input for skipping a processing program during execution, an input of a touch sensor signal, and the like), and an interface of a signal such as a real-time digital clock (RTC) (a clock signal of a clock circuit formed of a crystal oscillator operated by a battery or a capacitor and a count circuit of the crystal oscillator). Furthermore, the peripheral 27 also includes an interface for the storage device 32, the storage-class memory 33, and the display interface (I/F) 34.

The plurality of sub-CPUs 13 are connected to the plurality of corresponding respective integrated circuits 12. More specifically, the plurality of sub-CPUs 13 can be connected to one motor interface control unit 21, and, as described above, at least one motor interface control unit 21 is provided in such a way as to correspond to the number of the motor interfaces in one integrated circuit 12. The motor interface control unit 21 and the sub-CPU 13 are connected to each other via the sub-CPU serial interface 23 and the serial communication unit 42. The number of the sub-CPUs 13 connected to one motor interface control unit 21 may be set as appropriate depending on an arithmetic processing capacity and a control period of the sub-CPU 13, and the like. For example, when an extremely great number of motors (for example, about 100 motors) needs to be controlled and a motor needs to be controlled with high accuracy, an arithmetic throughput assigned to the integrated circuit 12 is enormous. In this way, when an arithmetic throughput assigned to the integrated circuit 12 is enormous, a great number of the sub-CPUs 13 may be connected, and the arithmetic processing may be shared by the great number of the sub-CPUs 13. Further, for example, when a small number of motors (for example, several motors) needs to be controlled and control accuracy of a motor is not required, an arithmetic throughput assigned to the integrated circuit 12 is small. In this way, when an arithmetic throughput assigned to the integrated circuit 12 is small, one or a few sub-CPUs 13 may be connected, and the arithmetic processing may be shared by the one or the few sub-CPUs 13.

The sub-CPU 13 is achieved by a multi-core (multi-thread) DSP, for example. The sub-CPU 13 controls an output of a drive command value by the motor interface control unit 21 in the integrated circuit 12 connected to the sub-CPU 13, based on a position command value and a position feedback value of a motor being read via the integrated circuit 12 connected to the sub-CPU 13. More specifically, the sub-CPU 13 reads a position command value and a position feedback value via the sub-CPU serial interface 23 and the serial communication unit 42, and performs the arithmetic processing of a drive command value (for example, a current command value) of a motor needed for control for moving the motor to a position of the position command value. The sub-CPU 13 transmits the generated drive command value to the motor interface control unit 21 via the serial communication unit 42 and the sub-CPU serial interface 23, and the motor interface control unit 21 further transmits the drive command value to the amplifier via the motor interface. The sub-CPU 13 repeatedly performs such arithmetic processing.

The storage device 32 connected to the integrated circuit 12 stores software (a program) needed for operating the motor interface control unit 21, and has an operation thereof controlled by the peripheral 27. Examples of the storage device 32 include an EMMC (registered trademark), an SD, an ESSD, and the like. Note that although not illustrated in the drawings, a boot ROM that stores boot loader software is connected to the integrated circuit 12, and the integrated circuit 12 reads the boot loader software during activation, performs initial setting itself and the like, and also loads software stored in the storage device 32 and deploys the software in the DRAM 31, a built-in memory of the sub-CPU 13, and the like.

The storage-class memory 33 connected to the integrated circuit 12 functions as an operation memory that stores a calculation value and the like in processing of the motor interface control unit 21, and is a non-volatile memory. Examples of the storage-class memory 33 include a magnetoresistive random access memory (MRAM), a resistive random access memory (ReRAM), a ferroelectric random access memory (FeRAM), an SRAM backed up by a battery, and the like.

The display interface 34 connected to the integrated circuit 12 is an interface for transmitting and receiving data for an external display to generate drawing data. Generation and display of drawing data are performed in the display (not illustrated) such as a liquid crystal display (LCD) and an organic EL display, based on data output from the display interface 34. Examples of the display interface 34 include Ethernet (registered trademark) and the like.

As described above, according to the embodiment of the present disclosure, the plurality of integrated circuits 12 are provided depending on the number of a plurality of motors being a control target of the motor control apparatus 1. The motor control apparatus 1 can handle control of various numbers of motors by changing the number of the integrated circuits 12. Thus, for example, by connecting, to the main CPU 11, the plurality of integrated circuits 12 formed of an ASIC configured for a standard number of control axes (for example, 3 to 32 axes and the like), a processing resource for controlling the plurality of axes can be increased, and an extremely great number of control axes (for example, about 33 to several hundred axes and the like) can also be controlled. Thus, according to the embodiment of the present disclosure, scalability with respect to the number of control axes can be improved. When the motor control apparatus 1 including an extremely great number of control axes is configured, the number of the integrated circuits 12 (for example, an application-specific integrated circuit configured for a standard number of control axes) connected to one main CPU 11 (for example, a multi-core CPU) may only be increased, and thus an ASIC configured for an extremely great number of control axes does not need to be newly developed. On the contrary, when the motor control apparatus 1 including not so many control axes is configured, the number of the integrated circuits 12 (for example, an application-specific integrated circuit configured for a standard number of control axes) connected to one main CPU 11 (for example, the multi-core CPU) may only be adjusted as appropriate, an opportunity to use the integrated circuit 12 exceeding of a specification and being high in price can be reduced, and as a result, a rise in price of the motor control apparatus itself can be suppressed. Further, the plurality of integrated circuits 12 corresponding to a plurality of respective motors are all connected to one main CPU 11, and thus integrated management of errors that may occur in any of the plurality of motors can be achieved in the main CPU 11. Further, setting a control period individually for each integrated circuit 12 is easy, and thus control optimized according to an application of a motor can be achieved.

Figure 2:
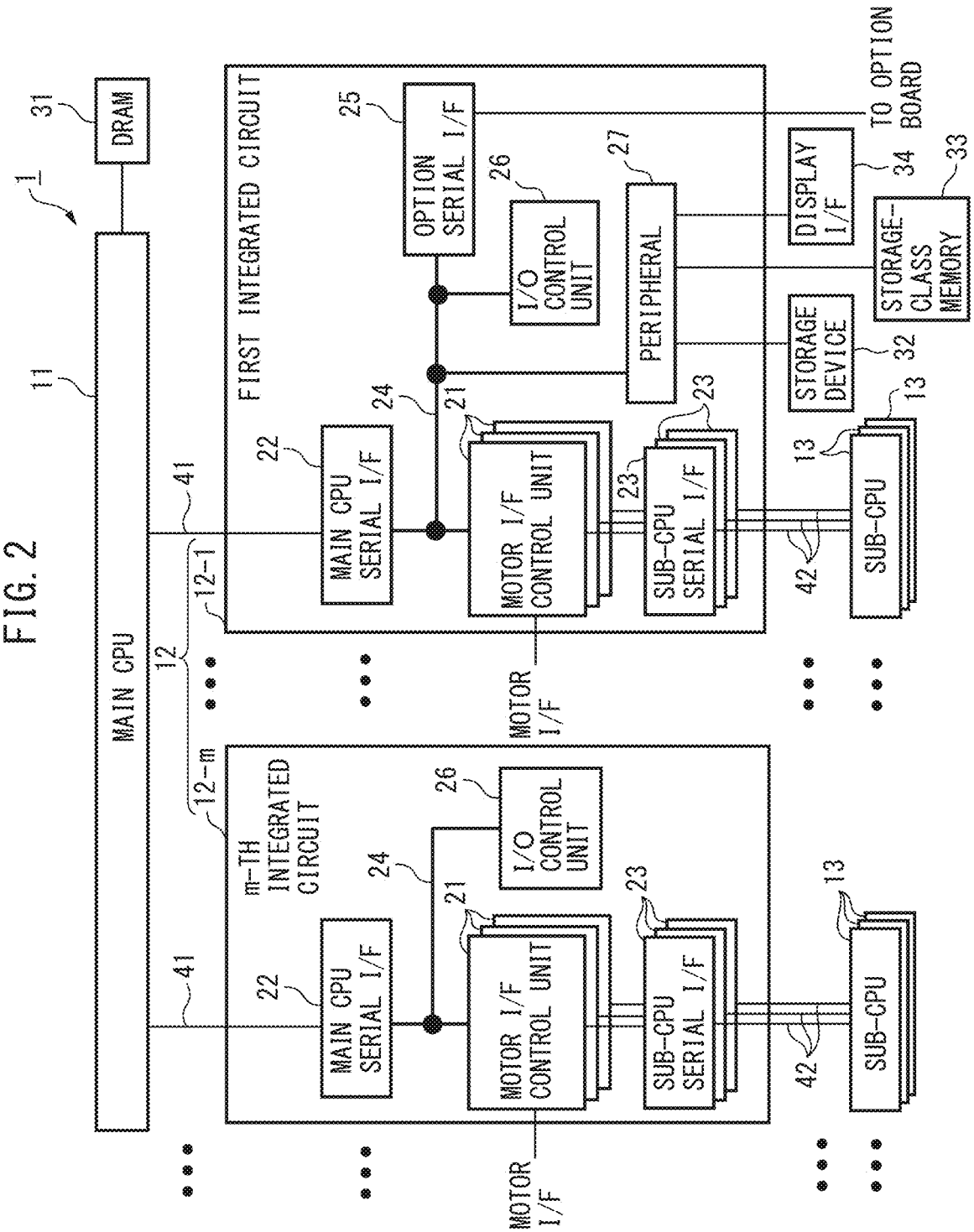
FIG. 2 is a configuration diagram illustrating an example in which an input/output control unit is provided in an m-th integrated circuit in the motor control apparatus according to the embodiment of the present disclosure.

The option serial interface 25, the input/output control unit 26, the peripheral 27, and a function other than these may be added to an integrated circuit corresponding to a motor according to an application of the motor. FIG. 2 is a configuration diagram illustrating an example in which an input/output control unit is provided in an m-th integrated circuit in the motor control apparatus according to the embodiment of the present disclosure. For example, the input/output (I/O) control unit 26 may also be provided in an m-th integrated circuit 12-*m* (note that m is a natural number of 2 or more) in addition to the first integrated circuit 12-1 among the plurality of integrated circuits 12. In this way, the main CPU 11 can control input/output communication via the input/output control unit 26 of any of the first integrated circuit 12-1 and the m-th integrated circuit 12-*m*.

Figure 3:
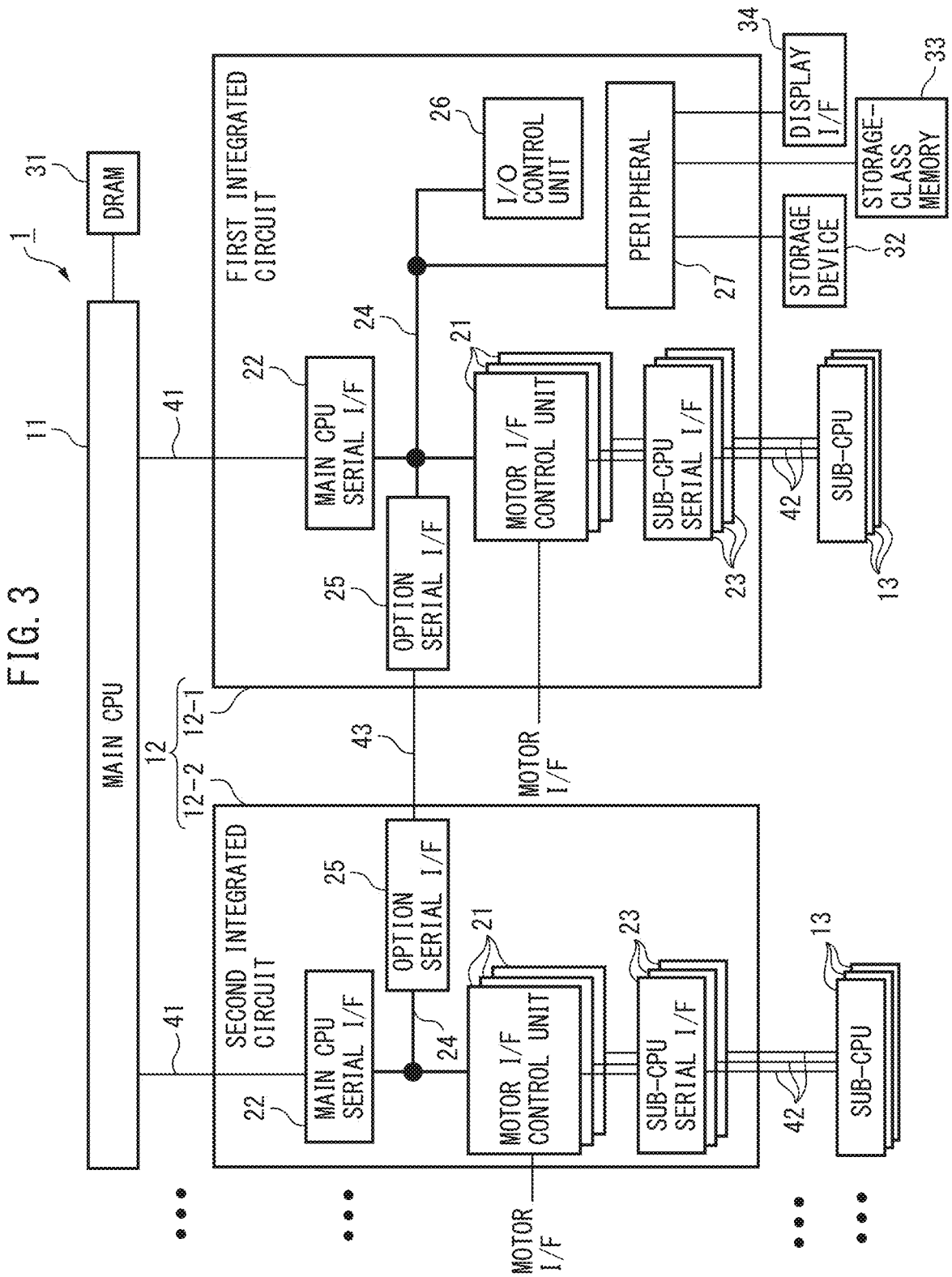
FIG. 3 is a configuration diagram illustrating an example in which integrated circuits are connected to each other in the motor control apparatus according to the embodiment of the present disclosure.

FIG. 3 is a configuration diagram illustrating an example in which integrated circuits are connected to each other in the motor control apparatus according to the embodiment of the present disclosure. All of the plurality of integrated circuits 12 or some of the plurality of integrated circuits 12 may be connected to each other via a serial communication unit 43 and the option serial interface 25. In the example illustrated in FIG. 3, the option serial interface 25 in the first integrated circuit 12-1 and the option serial interface 25 in the second integrated circuit 12-2 are connected to each other via the serial communication unit 43. In this way, by connecting the integrated circuits 12 to each other, data can be directly exchanged between the integrated circuits 12 without passing through the main CPU 11, and thus a delay of data transmission can be reduced, and a load on the arithmetic processing of the main CPU 11 can also be reduced. Note that an example of the serial communication unit 43 includes PCI Express (registered trademark). Further, the integrated circuits 12 may be connected to each other with, for example, Ethernet (registered trademark) instead of the serial communication unit 43, and, in this case, an interface corresponding to Ethernet (registered trademark) is provided in the integrated circuit 12.

Figure 4:
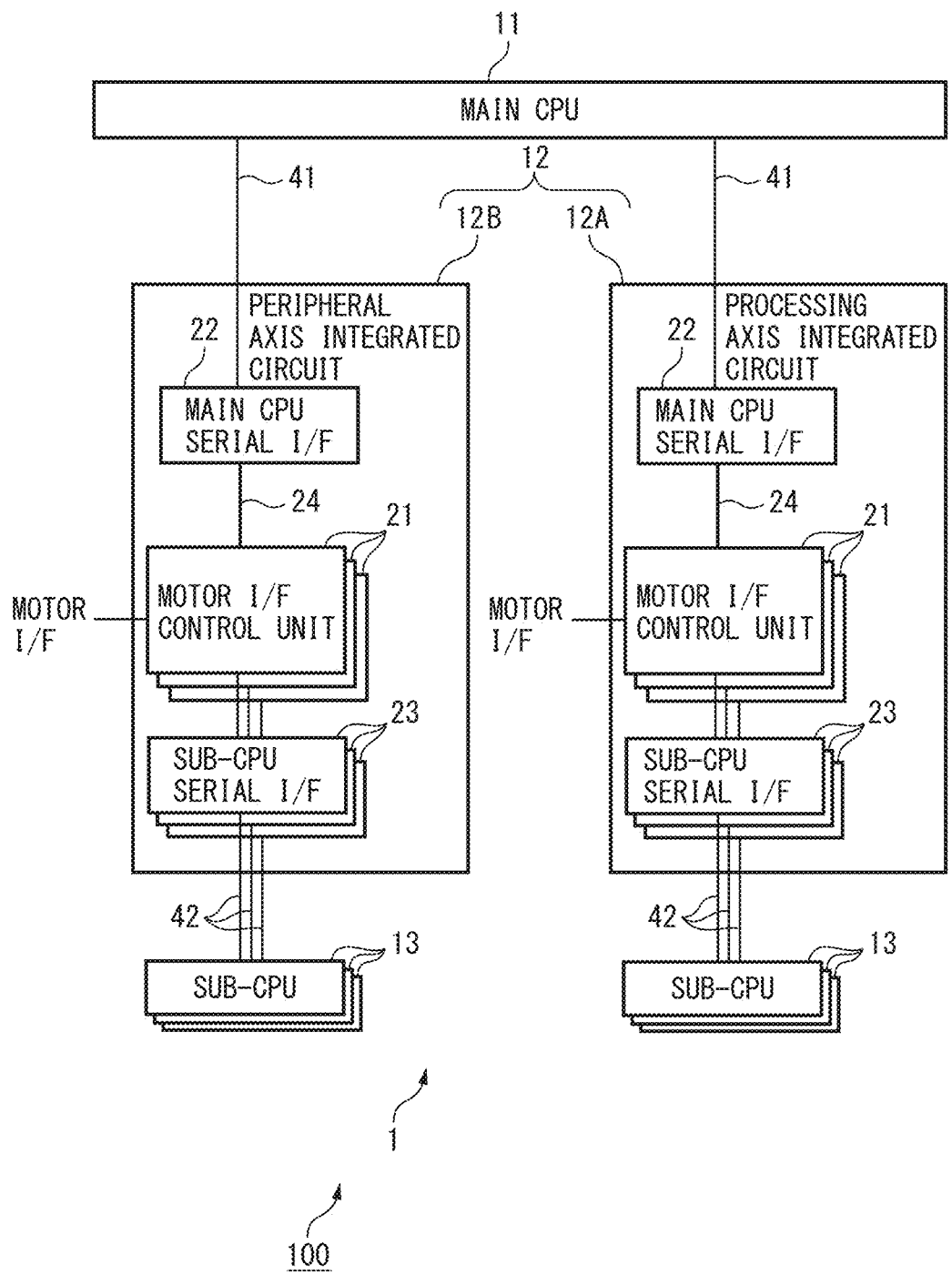
FIG. 4 is a configuration diagram illustrating a numerical control apparatus including the motor control apparatus according to the embodiment of the present disclosure.

The motor control apparatus 1 according to the embodiment of the present disclosure can be used in a numerical control apparatus that controls a machine. The numerical control apparatus that controls a machine includes the motor control apparatus 1, and controls, in each of a plurality of groups formed of an integrated circuit and a sub-CPU connected to the corresponding integrated circuit, at least one motor corresponding to the group among motors in the machine. Examples of the machine include a machine tool, forging machinery, an injection molding machine, industrial machinery, and the like. As one example herein, an example in which the motor control apparatus 1 according to the embodiment of the present disclosure is used in the numerical control apparatus that controls a machine tool including a processing axis and a peripheral axis will be described. FIG. 4 is a configuration diagram illustrating the numerical control apparatus including the motor control apparatus according to the embodiment of the present disclosure.

In one group formed of an integrated circuit and a sub-CPU connected to the corresponding integrated circuit, one motor may be controlled or a plurality of motors may be controlled. The number of groups formed of the integrated circuit 12 and the sub-CPU 13 connected to the corresponding integrated circuit 12 is set as appropriate depending on the number and control accuracy of motors, an arithmetic processing capacity and a control period of the sub-CPU 13, and the like. The motor is used as a drive source of a processing axis and a peripheral axis of a machine tool (not illustrated). A numerical control apparatus 100 including the motor control apparatus 1 controls, in at least one group among a plurality of groups formed of the integrated circuit 12 and the sub-CPU 13 connected to the corresponding integrated circuit 12, at least one motor (not illustrated) that drives the processing axis of the machine tool among the motors in the machine tool, and controls, in a group different from the at least one group among the plurality of groups, at least one motor (not illustrated) that drives the peripheral axis of the machine tool.

The example illustrated in FIG. 4 illustrates, as one example, a case where the numerical control apparatus 100 including the motor control apparatus 1 controls the motor (not illustrated) that drives the processing axis of the machine tool and the motor (not illustrated) that drives the peripheral axis of the machine tool. A processing axis integrated circuit 12A and a peripheral axis integrated circuit 12B are connected to the main CPU 11 via the serial communication unit 41. The main CPU 11 outputs a position command value with respect to the plurality of motors in the machine tool. The DRAM 31 connected to the main CPU 11 is omitted from the drawing. The plurality of processing axis integrated circuits 12A and/or peripheral axis integrated circuits 12B may be provided. The sub-CPU 13 is connected to the processing axis integrated circuit 12A and the peripheral axis integrated circuit 12B via the serial communication unit 42. The processing axis integrated circuit 12A and the peripheral axis integrated circuit 12B each include the motor interface control unit 21, the main CPU serial interface 22, and the sub-CPU serial interface 23. Note that, in FIG. 4, in order to simplify the drawing, the option serial interface 25, the input/output control unit 26, and the peripheral 27 provided in the processing axis integrated circuit 12A and the peripheral axis integrated circuit 12B, and the storage device 32, the storage-class memory 33, and the display interface 34 connected to the processing axis integrated circuit 12A and the peripheral axis integrated circuit 12B are omitted from the drawing.

Note that the peripheral axis integrated circuit 12B may perform, for example, output control of a laser oscillator, angle control of a mirror used for reflecting laser light, pressure control of a press mechanism, timing control of a discharge pulse voltage, temperature correction control of a machine, or the like, which is not limited to position control of a peripheral axis such as a loader in the machine tool. For example, when at least one motor that drives a processing axis of a machine tool among motors in the machine tool is controlled in at least one group (first group including the processing axis integrated circuit 12A) among a plurality of groups formed of the integrated circuit and the sub-CPU 13 connected to the corresponding integrated circuit, at least one motor that drives the peripheral axis of the machine tool may be driven in some group (second group) among groups (second and third groups including the peripheral axis integrated circuit 12B) different from the at least one group among the plurality of groups, and output control of a laser oscillator, angle control of a mirror used for reflecting laser light, pressure control of a press mechanism, timing control of a discharge pulse voltage, temperature correction control of a machine, or the like may be performed in another group (third group).

According to the numerical control apparatus 100 including the motor control apparatus 1 according to the embodiment of the present disclosure, a position command value of a great number of axes included in the machine tool can be calculated in one main CPU 11, and thus a position command of each axis can be synchronized and interpolated without an overhead of data communication as compared to a case where a position command value of a great number of axes is calculated in a plurality of CPUs.

Further, according to the numerical control apparatus 100 including the motor control apparatus 1 according to the embodiment of the present disclosure, integrated management of various errors that may occur in any of the processing axis and the peripheral axis of the machine tool can be achieved in one main CPU 11, and thus various retract operations and stop operations of the machine tool can be quickly performed even when, for example, an abnormality occurs in any of the processing axis and the peripheral axis. The retract operation is an operation of causing a workpiece and a tool to move to a position where they do not interfere with each other while holding synchronization between the workpiece and the tool when an error occurs in a machine tool in which numerical control is performed by the workpiece and the tool in synchronization, thereby occurrence of breakage due to a synchronization shift between the workpiece and the tool can be prevented.

Further, according to the numerical control apparatus 100 including the motor control apparatus 1 according to the embodiment of the present disclosure, the numerical control apparatus 100 can be configured by appropriately adjusting the number of the integrated circuits 12 (for example, an application-specific integrated circuit configured for a standard number of control axes) connected to one main CPU 11 depending on the number of processing axes and peripheral axes (i.e., depending on the number of motors), and thus designing the numerical control apparatus 100 depending on the number of control axes is easy, and a rise in price of the numerical control apparatus 100 itself can be suppressed. For example, production management can be achieved in such a way that the numerical control apparatus 100 including a standard number of control axes frequently appearing on the market is produced in large quantity, and the numerical control apparatus 100 including an extremely great number of control axes rarely appearing on the market is produced by appropriately increasing the number of the integrated circuits 12 in the numerical control apparatus 100 including a standard number of control axes, and thus a rise in price of the numerical control apparatus 100 itself can be suppressed.

Further, according to the numerical control apparatus 100 including the motor control apparatus 1 according to the embodiment of the present disclosure, setting a control period individually for the processing axis integrated circuit 12A and the peripheral axis integrated circuit 12B is easy, and setting a communication period corresponding to a motor interface of each motor that drives each of the processing axis and the peripheral axis is also easy, and thus efficiency use of processing performance and a communication band of the processing axis integrated circuit 12A and the peripheral axis integrated circuit 12B can be achieved. In this way, for example, proper use can be achieved in such a way that a few processing axis driving motors are controlled in a control period at a high speed in the processing axis integrated circuit 12A, and a great number of peripheral axis motors are controlled in a control period at a low speed in the peripheral axis integrated circuit 12B.

Figure 5:
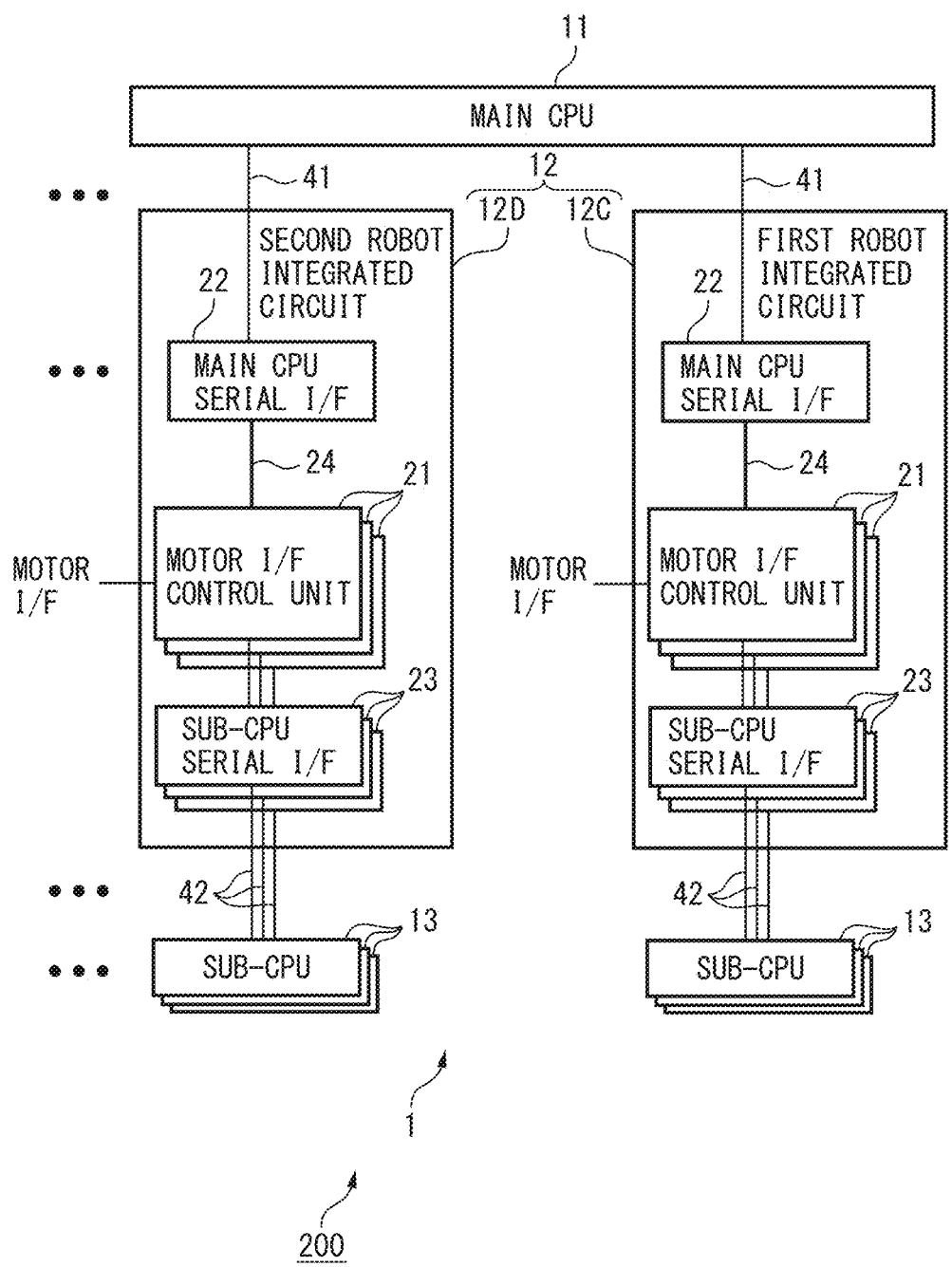
FIG. 5 is a configuration diagram illustrating a robot controller including the motor control apparatus according to the embodiment of the present disclosure.

The motor control apparatus 1 according to the embodiment of the present disclosure can be used in a robot controller that controls a robot. FIG. 5 is a configuration diagram illustrating the robot controller including the motor control apparatus according to the embodiment of the present disclosure.

As described above, in a group formed of the integrated circuit 12 and the sub-CPU 13 connected to the corresponding integrated circuit 12, one motor may be controlled or a plurality of motors may be controlled. A motor may be used as a drive source of an arm and the like of a robot (not illustrated) and a drive source for moving the robot itself. Further, a motor may be used as a drive source provided in a robot that operates in cooperation. A robot controller 200 including the motor control apparatus 1 controls at least one motor (not illustrated) that serves as a drive source of a robot in each of a plurality of groups formed of the integrated circuit 12 and the sub-CPU 13 connected to the corresponding integrated circuit 12.

The example illustrated in FIG. 5 illustrates, as one example, a case where the robot controller 200 including the motor control apparatus 1 controls two robots. A first robot integrated circuit 12C and a second robot integrated circuit 12D are connected to the main CPU 11 via the serial communication unit 41. The main CPU 11 outputs a position command value with respect to the plurality of motors in the robot. The DRAM 31 connected to the main CPU 11 is omitted from the drawing. The sub-CPU 13 is connected to the first robot integrated circuit 12C and the second robot integrated circuit 12D via the serial communication unit 42. The first robot integrated circuit 12C and the second robot integrated circuit 12D each include the motor interface control unit 21, the main CPU serial interface 22, and the sub-CPU serial interface 23. Note that, in FIG. 5, in order to simplify the drawing, the option serial interface 25, the input/output control unit 26, and the peripheral 27 provided in the first robot integrated circuit 12C and the second robot integrated circuit 12D, and the storage device 32, the storage-class memory 33, and the display interface 34 connected to the processing axis integrated circuit 12A and the peripheral axis integrated circuit 12B are omitted from the drawing.

According to the robot controller 200 including the motor control apparatus 1 according to the embodiment of the present disclosure, a position command value of a plurality of motors in at least one robot and a position command value of a plurality of motors in a plurality of robots can be calculated in one main CPU 11, and thus a position command of each axis can be synchronized and interpolated without an overhead of data communication as compared to a case where a position command value of the plurality of motors in the robot is calculated in a plurality of CPUs.

Further, according to the robot controller 200 including the motor control apparatus 1 according to the embodiment of the present disclosure, integrated management of various errors that may occur in any of the plurality of robots can be achieved in one main CPU 11, and thus various retract operations and stop operations of the robot can be quickly performed even when, for example, an abnormality occurs in any of the plurality of robots.

Further, according to the robot controller 200 including the motor control apparatus 1 according to the embodiment of the present disclosure, the robot controller 200 can be configured by appropriately adjusting the number of the integrated circuits 12 (for example, an application-specific integrated circuit configured for a standard number of control axes) connected to one main CPU 11 depending on the number of robots and the number of motors provided in the robot, and thus designing the robot controller 200 depending on the number of motors (control axes) is easy, and a rise in price of the robot controller 200 itself can be suppressed. For example, production management can be achieved in such a way that the robot controller 200 including a standard number of control axes frequently appearing on the market is produced in large quantity, and the robot controller 200 including an extremely great number of control axes rarely appearing on the market is produced by appropriately increasing the number of the integrated circuits 12 in the robot controller 200 including a standard number of control axes, and thus a rise in price of the robot controller 200 itself can be suppressed.

Further, according to the robot controller 200 including the motor control apparatus 1 according to the embodiment of the present disclosure, setting a control period individually for each robot or each motor in the robot is easy, and setting a communication period corresponding to a motor interface of each motor that drives the robot is also easy, and thus efficiency use of processing performance and a communication band of the integrated circuit 12 can be achieved. In this way, for example, proper use can be achieved in such a way that a motor in a high speed robot is controlled in a control period at a high speed in a certain integrated circuit 12, and a motor in a low speed robot is controlled in a control period at a low speed in another integrated circuit 12.

Figure 6:
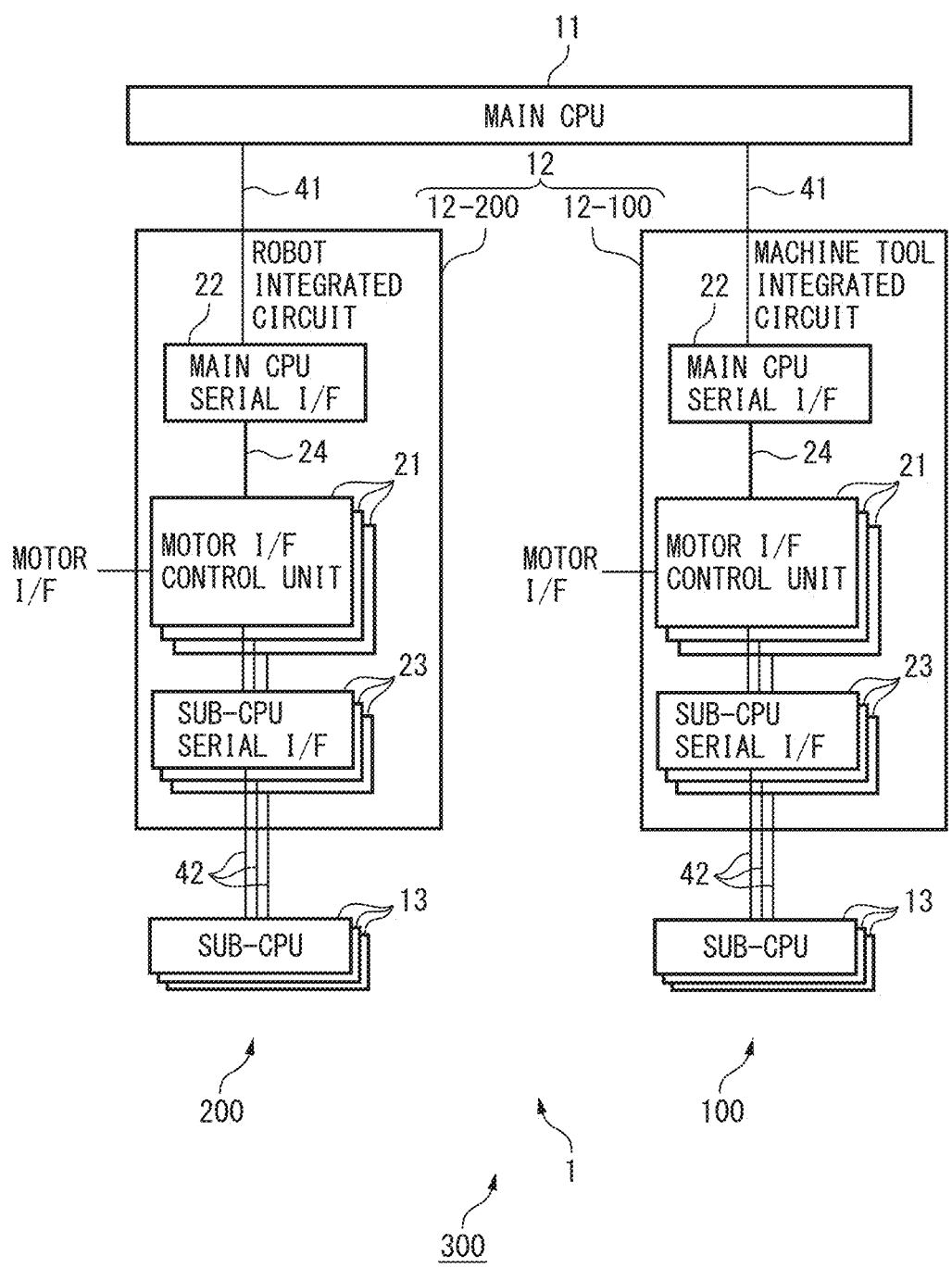
FIG. 6 is a configuration diagram illustrating an integrated controller system including the motor control apparatus according to the embodiment of the present disclosure.

The motor control apparatus 1 according to the embodiment of the present disclosure can be used in an integrated controller system configured to control both of at least one machine and at least one robot. The integrated controller system includes the motor control apparatus 1, and controls, in at least one group among a plurality of groups formed of an integrated circuit and a sub-CPU connected to the corresponding integrated circuit, at least one motor corresponding to the group among motors in the machine, and controls, in a group different from the at least one group among the plurality of groups, at least one motor that serves as a drive source of the robot. Examples of the machine include a machine tool, forging machinery, an injection molding machine, industrial machinery, and the like. Herein, as one example, an example in which the motor control apparatus 1 according to the embodiment of the present disclosure is used in an integrated controller system for controlling both of at least one machine tool including a processing axis and a peripheral axis and at least one robot will be described. FIG. 6 is a configuration diagram illustrating the integrated controller system including the motor control apparatus according to the embodiment of the present disclosure.

An integrated controller system 300 including the motor control apparatus 1 according to the embodiment of the present disclosure controls both of at least one machine tool and at least one robot. In other words, the integrated controller system 300 is acquired by integrating functions of both of the numerical control apparatus 100 that controls a machine tool and the robot controller 200 that controls a robot via one main CPU 11. A machine tool integrated circuit 12-100 that achieves the function of the numerical control apparatus 100 and the sub-CPU 13 connected to the machine tool integrated circuit 12-100, and a robot integrated circuit 12-200 that achieves the function of the robot controller 200 and the sub-CPU 13 connected to the robot integrated circuit 12-200 are connected to the main CPU 11.

As described above, in a group formed of the integrated circuit 12 and the sub-CPU 13 connected to the corresponding integrated circuit 12, one motor may be controlled or a plurality of motors may be controlled. The motor is used as a drive source of a processing axis and a peripheral axis of a machine tool (not illustrated). Further, the motor is used as a drive source of an arm and the like of a robot (not illustrated) and a drive source for moving the robot itself. Further, the motor may be used as a drive source of each motor provided in a robot that operates in cooperation. In the numerical control apparatus 100 in the integrated controller system 300, a motor (not illustrated) that drives at least one of a processing axis and a peripheral axis of a machine tool among motors in the machine tool is controlled in at least one group among a plurality of groups formed of the integrated circuit 12 and the sub-CPU 13 connected to the corresponding integrated circuit 12. Further, in the robot controller 200 in the integrated controller system 300, at least one motor (not illustrated) that serves as a drive source of a robot is each controlled in a group different from the at least one group among the plurality of groups.

In the example illustrated in FIG. 6, as one example, the numerical control apparatus 100 in the integrated controller system 300 includes the machine tool integrated circuit 12-100, and the robot controller 200 in the integrated controller system 300 includes the robot integrated circuit 12-200. The plurality of machine tool integrated circuits 12-100 and/or robot integrated circuits 12-200 may be provided. Further, the processing axis integrated circuit 12A and the peripheral axis integrated circuit 12B described with reference to FIG. 4 are included in the machine tool integrated circuit 12-100. The machine tool integrated circuit 12-100 and the robot integrated circuit 12-200 are connected to the main CPU 11 via the serial communication unit 41. The main CPU 11 outputs a position command value with respect to the plurality of motors in the machine tool and the plurality of motors in the robot. The DRAM 31 connected to the main CPU 11 is omitted from the drawing. The sub-CPU 13 is connected to the machine tool integrated circuit 12-100 and the robot integrated circuit 12-200 via the serial communication unit 42. The machine tool integrated circuit 12-100 and the robot integrated circuit 12-200 each include the motor interface control unit 21, the main CPU serial interface 22, and the sub-CPU serial interface 23. Note that, in FIG. 6, in order to simplify the drawing, the option serial interface 25, the input/output control unit 26, and the peripheral 27 provided in the machine tool integrated circuit 12-100 and the robot integrated circuit 12-200, and the storage device 32, the storage-class memory 33, and the display interface 34 connected to the machine tool integrated circuit 12-100 and the robot integrated circuit 12-200 are omitted from the drawing.

Note that the machine tool integrated circuit 12-100 may perform, for example, output control of a laser oscillator, angle control of a mirror used for reflecting laser light, pressure control of a press mechanism, timing control of a discharge pulse voltage, temperature correction control of a machine, or the like, which is not limited to position control of a motor in the machine tool. For example, in at least one group (first to third groups including the machine tool integrated circuit 12-100) among a plurality of groups formed of the integrated circuit and the sub-CPU 13 connected to the corresponding integrated circuit, at least one motor that drives a processing axis of a machine tool among motors in the machine tool may be controlled in the first group, at least one motor that drives a peripheral axis of the machine tool may be driven in the second group, and output control of a laser oscillator, angle control of a mirror used for reflecting laser light, pressure control of a press mechanism, timing control of a discharge pulse voltage, temperature correction control of a machine, or the like may be performed in the third group.

According to the integrated controller system 300 including the motor control apparatus 1 according to the embodiment of the present disclosure, a position command value of a great number of motors with respect to a plurality of motors in a machine tool and a plurality of motors in a robot can be calculated in one main CPU 11, and thus a position command of each axis can be synchronized and interpolated without an overhead of data communication as compared to a case where a position command value of the plurality of motors in the machine tool and the robot is calculated in a plurality of CPUs.

Further, according to the integrated controller system 300 including the motor control apparatus 1 according to the embodiment of the present disclosure, integrated management of various errors that may occur in any of the processing axis and the peripheral axis of the machine tool, and the robot can be achieved in one main CPU 11, and thus various retract operations and stop operations of the machine tool and/or the robot can be quickly performed even when, for example, an abnormality occurs in any of the processing axis, the peripheral axis, and the robot.

Further, according to the integrated controller system 300 including the motor control apparatus 1 according to the embodiment of the present disclosure, the integrated controller system 300 can be configured by appropriately adjusting the number of the integrated circuits 12 (for example, an application-specific integrated circuit configured for a standard number of control axes) connected to one main CPU 11 depending on the number of processing axes and peripheral axes and the number of robots (i.e., depending on the number of motors), and thus designing the integrated controller system 300 depending on the number of motors (control axes) is easy, and a rise in price of the integrated controller system 300 itself can be suppressed. For example, production management can be achieved in such a way that the integrated controller system 300 including a standard number of control axes frequently appearing on the market is produced in large quantity, and the integrated controller system 300 including an extremely great number of control axes rarely appearing on the market is produced by appropriately increasing the number of the integrated circuits 12 in the integrated controller system 300 including a standard number of control axes, and thus a rise in price of the integrated controller system 300 itself can be suppressed.

Further, according to the integrated controller system 300 including the motor control apparatus 1 according to the embodiment of the present disclosure, setting a control period individually for the machine tool integrated circuit 12-100 and the robot integrated circuit 12-200 is easy, and setting a communication period corresponding to a motor interface of each motor that drives each of a processing axis, a peripheral axis, and a robot is also easy, and thus efficiency use of processing performance and a communication band of the machine tool integrated circuit 12-100 and the robot integrated circuit 12-200 can be achieved. In this way, for example, proper use can be achieved in such a way that a processing axis driving motor in a machine tool is controlled in a control period at a high speed in the machine tool integrated circuit 12-100, and a motor in a robot is controlled in a control period at a low speed in the robot integrated circuit 12-200.

Further, according to the integrated controller system 300 including the motor control apparatus 1 according to the embodiment of the present disclosure, the machine tool integrated circuit 12-100 and the robot integrated circuit 12-200 are connected to one main CPU 11. The machine tool integrated circuit 12-100 and the sub-CPU 13 connected to the machine tool integrated circuit 12-100 take the responsibility of executing various processing of the numerical control apparatus 100, and the robot integrated circuit 12-200 and the sub-CPU 13 connected to the robot integrated circuit 12-200 take the responsibility of executing various processing of the robot controller 200. Since a position command value of all motors included in both of a machine tool and a robot is calculated in the main CPU 11, a configuration of a control software program of the main CPU 11 becomes simple. In other words, a control software program can be designed under the same concept without a distinction between a machine tool and a robot while separate control software programs do not need to be separately designed for the machine tool and the robot, and thus development efficiency of the program improves.

In general, an effort to accumulate effects of shortening a cycle time in a few milliseconds units has been made by improving a software program and the like in fields of a machine tool and a robot. In the integrated controller system 300 including the motor control apparatus 1 according to the embodiment of the present disclosure, the main CPU 11, and the machine tool integrated circuit 12-100 and the robot integrated circuit 12-200 are connected to each other with the serial communication unit 41. When PCI Express (registered trademark) is used as the serial communication units 41 and 42, a signal transmission delay time thereof is about several tens of microseconds, and is extremely shorter than several tens to several hundreds of milliseconds being a signal transmission delay time of Ethernet (registered trademark). According to the integrated controller system 300, the signal transmission delay time in the serial communication units 41 and 42 is extremely short as described above, thereby having an extremely great effect on shortening of a cycle time. In regard to this, several specific examples of synchronization and interpolation in a cooperative operation between a machine tool and a robot in the integrated controller system 300 are listed below.

For example, when a robot performs loading and unloading of a machine tool, the loading operation by the robot is performed before the machine tool processes a workpiece, and the unloading operation by the robot is performed after the machine tool processes the workpiece. A loading request signal and an unloading request signal are transmitted to the robot before and after the machine tool processes the workpiece. In the conventional manner, a relatively great time delay (for example, several tens to several hundreds of milliseconds) present until position information about a tool and a workpiece is transmitted to a robot is considered, and the robot avoids a collision between the tool and the workpiece and moves the tool and the workpiece by taking the time delay into consideration, and thus it is difficult for the robot to move to the immediate vicinity of the workpiece upon the loading operation and the unloading operation, and a movement path of the robot also tends to be a detour. In contrast, according to the integrated controller system 300 including the motor control apparatus 1 according to the embodiment of the present disclosure, position information about a workpiece is immediately transmitted between the main CPU 11, and the machine tool integrated circuit 12-100 and the robot integrated circuit 12-200 via the serial communication unit 41, and is immediately transmitted between the machine tool integrated circuit 12-100 and the robot integrated circuit 12-200, and the sub-CPU 13 via the serial communication unit 42 in the integrated controller system 300. Further, since the signal transmission delay time in the serial communication units 41 and 42 is extremely short as described above, a start time of processing by a machine tool as well as a loading operation and an unloading operation by a robot can be determined based on "fresher" position information about a workpiece. Herein, "fresh" refers to a short time difference between a point in time when a sensor detects position information about a workpiece and a point in time when the main CPU 11 acquires the position information about the workpiece, and the shorter time difference means that the position information about the workpiece is "fresher". According to the integrated controller system 300 including the motor control apparatus 1 according to the embodiment of the present disclosure, a loading operation and an unloading operation by a robot can be performed even during processing by a machine tool while preventing a collision between a tool and a workpiece by taking a positional relationship between the tool and the workpiece in the machine tool into consideration, and can thus shorten a cycle time.

For example, when a robot performs deburring during a movement of a workpiece in a machine tool, a movement speed of the workpiece needs to be reduced in order to maintain deburring accuracy in the conventional manner, and a problem that a cycle time increases occurs. According to the integrated controller system 300 including the motor control apparatus 1 according to the embodiment of the present disclosure, since the signal transmission delay time in the serial communication units 41 and 42 is extremely short as described above, the main CPU 11 can acquire "fresher" position information about a workpiece for deburring, and thus highly accurate deburring can be achieved by following a movement of the workpiece even during the movement of the workpiece. For example, a workpiece on a rotary table can be easily deburred from all directions. Thus, a faster movement speed of a workpiece in a range of accuracy required for the workpiece further shortens a cycle time.

For example, when an error occurs in a machine tool, the machine tool performs a stop operation or a retract operation. When a lot of time is required since the occurrence of the error in the machine tool until notification about the error to a robot controller, the robot continues to operate during the period, and thus a problem that the robot collides with a tool and a workpiece in the machine tool and an unexpected place is deburred occurs. According to the integrated controller system 300 including the motor control apparatus 1 according to the embodiment of the present disclosure, since integrated management of errors can be achieved in a machine tool in the main CPU 11, and the signal transmission delay time in the serial communication units 41 and 42 is extremely short as described above, the main CPU 11 immediately notifies the robot integrated circuit 12-200 of error information, and the robot integrated circuit 12-200 accordingly controls a motor in a robot in such a way that the robot immediately performs the stop operation or the retract operation, and thus a collision of the robot with a tool and a workpiece in the machine tool can be avoided.

For example, as the retract operation of a machine tool when an error occurs in the machine tool, an operation of retracting a tool in an opposite direction to an approach during a normal condition may be performed. This is an unpredictable sudden operation from a viewpoint of a robot, and a problem that the robot collides with a tool and a workpiece in the machine tool occurs. According to the integrated controller system 300 including the motor control apparatus 1 according to the embodiment of the present disclosure, since integrated management of errors can be achieved in a machine tool in the main CPU 11, and the signal transmission delay time in the serial communication units 41 and 42 is extremely short as described above, the main CPU 11 immediately notifies the robot integrated circuit 12-200 of error information and position information about a workpiece, and the robot integrated circuit 12-200 accordingly controls a motor in a robot in such a way that the robot immediately performs the stop operation or the retract operation, and thus a collision of the robot with a tool and the workpiece in the machine tool can be avoided.

The embodiment of the present disclosure is described above, but it is needless to say that various modification examples can be made. For example, what kind of functional portion is integrated with each IC should be appropriately determined according to specifications, and various modification examples can be accordingly made.

According to one aspect of the present disclosure, a motor control apparatus, a numerical control apparatus, a robot controller, and an integrated controller system in which scalability with respect to the number of control axes is improved can be achieved.

The invention claimed is:

1. A motor control apparatus, comprising:
a main CPU configured to output a position command value with respect to a plurality of motors;
a plurality of integrated circuits connected to the main CPU and provided depending on the number of the plurality of motors; and
a plurality of sub-CPUs connected to the plurality of corresponding respective integrated circuits, wherein
each of the plurality of integrated circuits includes a motor interface control unit that outputs a drive command value to an amplifier that drives each of the motors in such a way as to move the motor to a position of the position command value, and
each of the plurality of sub-CPUs controls an output of the drive command value by the motor interface control unit in the integrated circuit connected to the sub-CPU, based on the position command value and a position feedback value of the motor being read via the integrated circuit connected to the sub-CPU.

2. The motor control apparatus according to claim 1, wherein
each of the plurality of integrated circuits includes
a main CPU serial interface configured to perform communication between the main CPU and the motor interface control unit,
a sub-CPU serial interface configured to perform communication between the sub-CPU connected to the integrated circuit and the motor interface control unit, and
an internal bus configured to connect the main CPU serial interface and the motor interface control unit.

3. The motor control apparatus according to claim 2, wherein
each of the plurality of integrated circuits includes an option serial interface connected to the internal bus, and the motor interface control unit of each of the plurality of integrated circuits is connected to each other via the option serial interface.

4. The motor control apparatus according to claim 2, wherein
each of the plurality of integrated circuits includes an input/output control unit that is connected to the internal bus, and configured to perform input/output of an external signal.

5. The motor control apparatus according to claim 1, wherein
the main CPU is a multi-core CPU.

6. The motor control apparatus according to claim 1, wherein
the sub-CPU is a multi-core DSP.

7. The motor control apparatus according to claim 1, wherein
the integrated circuit is an application-specific integrated circuit.

8. A numerical control apparatus configured to control a machine, the numerical control apparatus comprising
the motor control apparatus according to claim 1, wherein,
each of a plurality of groups formed of the integrated circuit and the sub-CPU connected to the corresponding integrated circuit controls at least one motor corresponding to the group among the motors in the machine.

9. The numerical control apparatus according to claim 8, wherein
the machine is a machine tool,
in at least one group among the plurality of groups, at least one motor configured to drive a processing axis of the machine tool among the motors in the machine tool is controlled, and,
in a group different from the at least one group among the plurality of groups, at least one motor configured to drive a peripheral axis of the machine tool among the motors in the machine tool is controlled.

10. A robot controller configured to control at least one robot, the robot controller comprising:
the motor control apparatus according to claim 1, wherein,
in each of a plurality of groups formed of the integrated circuit and the sub-CPU connected to the corresponding integrated circuit, the robot controller controls at least one motor that serves as a drive source of the robot.

11. An integrated controller system configured to control both of at least one machine and at least one robot, the integrated controller system comprising:
the motor control apparatus according to claim 1, wherein,
in at least one group among a plurality of groups formed of the integrated circuit and the sub-CPU connected to the corresponding integrated circuit, the integrated controller system controls at least one motor corresponding to the group among the motors in the machine, and,
in a group different from the at least one group among the plurality of groups, the integrated controller system controls at least one motor that serves as a drive source of the robot.

12. The integrated controller system according to claim 11, wherein
the machine is a machine tool,
in at least one group among the plurality of groups, the integrated controller system controls at least one motor configured to drive at least one of a processing axis and a peripheral axis of the machine tool among the motors in the machine tool, and, in a group different from the at least one group among the plurality of groups, the integrated controller system controls at least one motor configured to serve as a drive source of the robot.

* * * * *